(12) United States Patent
Wu et al.

(10) Patent No.: US 11,767,450 B2
(45) Date of Patent: Sep. 26, 2023

(54) ADHESIVE, DIE ATTACH FILM AND PREPARATION METHOD THEREFOR

(71) Applicant: Wuhan Choice Technology Co, Ltd, Wuhan (CN)

(72) Inventors: De Wu, Wuhan (CN); Shuhang Liao, Wuhan (CN); Ting Li, Wuhan (CN); Yi Wang, Wuhan (CN); Junxing Su, Wuhan (CN)

(73) Assignee: Wuhan Choice Technology Co, Ltd, Wuhan (CN)

( * ) Notice: Subject to any disclaimer, the term of this patent is extended or adjusted under 35 U.S.C. 154(b) by 0 days.

(21) Appl. No.: 18/307,588

(22) Filed: Apr. 26, 2023

(65) Prior Publication Data
US 2023/0265322 A1 Aug. 24, 2023

Related U.S. Application Data

(63) Continuation of application No. PCT/CN2022/099180, filed on Jun. 16, 2022.

(30) Foreign Application Priority Data

Dec. 9, 2021 (CN) .......................... 202111498623.2

(51) Int. Cl.
 *C09J 163/00* (2006.01)
 *C09J 11/08* (2006.01)
 *C09J 11/06* (2006.01)

(52) U.S. Cl.
 CPC ............. *C09J 163/00* (2013.01); *C09J 11/06* (2013.01); *C09J 11/08* (2013.01); *C09J 2301/312* (2020.08)

(58) Field of Classification Search
 CPC . C09J 163/00; C09J 11/06; C09J 11/08; C09J 2301/312
 See application file for complete search history.

(56) References Cited

U.S. PATENT DOCUMENTS

2021/0183719 A1* 6/2021 Nishidono ............... C08K 3/36

FOREIGN PATENT DOCUMENTS

| CN | 102559113 A | * | 7/2012 | ............ C09J 163/00 |
| CN | 102559113 A | | 7/2012 | |
| CN | 108102594 A | | 6/2018 | |
| CN | 111315820 A | * | 6/2020 | ............... C08K 3/22 |
| CN | 111315820 A | | 6/2020 | |
| CN | 112778937 A | * | 5/2021 | ............... B41C 1/14 |

OTHER PUBLICATIONS

Machine Translation of CN112778937A (Year: 2021).*
Machine Translation of CN102559113A (Year: 2012).*

* cited by examiner

*Primary Examiner* — Daniel McNally
(74) *Attorney, Agent, or Firm* — Nitin Kaushik

(57) ABSTRACT

Embodiments of the present application disclose an adhesive, a die attach film and a preparation method therefor, and relate to the technical field of chip packaging. The adhesive includes epoxy resin, phenoxy resin, an indene oligomer, filler and a curing agent; and 20-60 parts of the epoxy resin, 20-30 parts of the phenoxy resin, 5-10 parts of the indene oligomer, 15-30 parts of the filler and 1-5 parts of the curing agent are provided in parts by mass. The present application further provides the die attach film and the preparation method therefor. In the adhesive provided by the present application, the epoxy resin, the phenoxy resin and the indene oligomer are used as curable substrates to improve a thermal stress obtained after the adhesive is cured, so that the die attach film prepared therefrom is not easy to warp in a temperature change process.

10 Claims, No Drawings

ADHESIVE, DIE ATTACH FILM AND PREPARATION METHOD THEREFOR

CROSS-REFERENCE TO RELATED APPLICATIONS

The application claims priority to Chinese patent application No. CN202111498623.2, filed on Dec. 9, 2021, the entire contents of which are incorporated herein by reference.

TECHNICAL FIELD

The present application relates to the technical field of chip packaging, in particular to an adhesive, a die attach film and a preparation method therefor.

BACKGROUND

With the high functionality of semiconductor packaging and the high-density installation in semiconductor packaging, the use frequency of a DAF (Die Attach Film) in semiconductor packaging is gradually increasing. As a bonding material between a chip and a support as well as between chips in a semiconductor device, the DAF directly affects the reliability of the semiconductor device in terms of mechanical strength, bonding strength, thermal resistance and thermal conductivity, thereby playing an important role in the bonding material of the entire semiconductor device.

In a manufacturing process of the semiconductor device, in order to evaluate, analyze and improve the environmental adaptability of the semiconductor device, it is often necessary to do a cold and hot shock experiment on the semiconductor device. In this experiment, chemical change or physical damage which can be withstood by the semiconductor device and caused by thermal expansion is tested by applying periodic transient cold and hot temperature cycles to the semiconductor device. In this experiment, the stacked chips and DAF are prone to stress concentration, which further results in delamination and fracture of chips and the DAF. However, with the development of the semiconductor device to miniaturization and high efficiency, the thickness of a wafer used in the semiconductor device is decreasing day by day, and the number of the stacked chips is continuously increasing, which makes the stacked chips and the DAF easier to warp in the cold and hot shock experiment, and thus, the chips and the DAF are easier to delaminate and fracture.

SUMMARY

An embodiment of the present application provides an adhesive to improve a thermal stress obtained after the adhesive is cured, and improve the adhesive property after the adhesive is cured.

For another objective, an embodiment of the present application provides a die attach film.

For further objective, an embodiment of the present application further provides a preparation method for a die attach film.

Technical solutions of the present application are described as follows.

In a first aspect, an embodiment of the present application provides an adhesive, including epoxy resin, phenoxy resin, an indene oligomer, filler and a curing agent; and 20-60 parts of the epoxy resin, 20-30 parts of the phenoxy resin, 5-10 parts of the indene oligomer, 15-30 parts of the filler and 1-5 parts of the curing agent are provided in parts by mass;

wherein the indene oligomer has a chemical structural formula shown as:

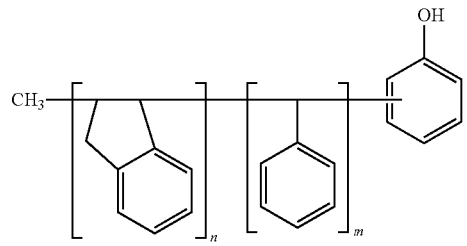

wherein n and m are integers, $1 \leq n \leq 10$, and $1 \leq m \leq 6$.

Optionally, in some embodiments of the present application, 45-50 parts of the epoxy resin, 25-30 parts of the phenoxy resin, 8-10 parts of the indene oligomer, 20-25 parts of the filler and 2-3 parts of the curing agent are provided in parts by mass.

Optionally, in some embodiments of the present application, the epoxy resin includes bisphenol epoxy resin, polyurethane-modified epoxy resin and naphthalene ring epoxy resin; and a mass ratio of the bisphenol epoxy resin to the polyurethane-modified epoxy resin to the naphthalene ring epoxy resin is 1:(1-2):(0.25-0.67).

Optionally, in some embodiments of the present application, an epoxy equivalent of the bisphenol epoxy resin is 160-180 g/eq; and/or
an epoxy equivalent of the polyurethane-modified epoxy resin is 210-250 g/eq.

Optionally, in some embodiments of the present application, the bisphenol epoxy resin is selected from one or more of bisphenol-F epoxy resin, bisphenol-S epoxy resin and bisphenol-A epoxy resin.

Optionally, in some embodiments of the present application, the curing agent is selected from one or more of dicyandiamide, a naphthol curing agent and phenolic resin.

Optionally, in some embodiments of the present application, the adhesive further includes an accelerator, and 0.1-0.5 part of the accelerator is provided in parts by mass.

In a second aspect, an embodiment of the present application further provides a die attach film prepared from the adhesive in the first aspect.

In a third aspect, the present application further provides a preparation method for a die attach film, including:
providing raw materials of the adhesive in the first aspect; and
after the raw materials are mixed, performing flattening and drying to obtain the die attach film.

In an adhesive provided in an embodiment of the present application, epoxy resin, phenoxy resin and indene oligomer are used as curable substrates to raise a glass transition temperature of the cured adhesive and improve the thermal resistance, stability, moisture resistance and chemical resistance of the adhesive, so that the adhesive is wider in application range. The phenoxy resin may further improve the support and melt viscosity of the cured adhesive, so that the adhesive is easy to peel or cut when being cured to form a film, at the same time, the thermal stress of the resin formed after the adhesive is cured is reduced, and then, warpage of a film layer based on the adhesive is reduced. In addition, the adhesive is also internally added with the filler by which the strength and thermal expansion coefficient of the adhesive can be improved.

An embodiment of the present application further provides a die attach film. The die attach film is prepared from an adhesive in which epoxy resin, phenoxy resin and an indene oligomer are used as curable substrates, so that the indene oligomer can be crosslinked with the epoxy resin and the phenoxy resin under the action of a curing agent, then, resin obtained after the adhesive is cured can play a role in releasing a stress in a stress state to relieve the degree of stress concentration, a crosslinked network chain formed after the adhesive is cured can uniformly bear a greater stress, and the stress release property of the DAF is improved. At the same time, due to the adoption of the curable substrates, the curing agent and the filler, the DAF based on the adhesive is higher in glass transition temperature and tensile strength and lower in thermal expansion coefficient and storage modulus, the thermal stress of the DAF is reduced, the probability that chips and the DAF of a semiconductor device based on the die attach film are delaminated and fractured in a cold and hot shock experiment is reduced, and the performance of the semiconductor device is improved. At the same time, the die attach film provided by the present application further has good thermal resistance, stability, moisture resistance and chemical resistance and improves the stability and application range of the semiconductor device based on the die attach film.

An embodiment of the present application further provides a preparation method for a die attach film. The preparation method is simple, and the die attached film prepared thereby has a flat surface and excellent properties.

DETAILED DESCRIPTION OF THE EMBODIMENTS

The technical solutions in the embodiments of the present application will be clearly and completely described below in combination with the embodiments of the present application. Apparently, the described embodiments are only a part of the embodiments of the present application, but not all of the embodiments. Based on the embodiments of the present application, all other embodiments obtained by those skilled in the art without creative effort shall fall within the protection scope of the present application.

Embodiments of the present application provide an adhesive, a die attach film and a preparation method therefor, which will be respectively described in detail below. It should be noted that the following order of description for the embodiments is not intended to limit a preferred order for the embodiments. In addition, in the description of the present application, the term "including" refers to "including, but not limited to". Terms such as first, second and third are merely intended to be used as marks, rather than to impose numerical requirements or establish an order. Various embodiments of the present application can exist in a form of a range. It should be understood that the description in a form of a range is only for the purposes of convenience and simplicity and should not be understood as an inflexible limitation on the scope of the present application. Therefore, it should be considered that all possible sub-ranges and a single value in the range have been specifically disclosed in the description for the range. For example, it should be considered that sub-ranges such as 1-2, 1-3, 1-4, 1-5, 2-3, 2-4, 2-5, 3-4, 3-5 and 4-5 and a single number such as 1, 2, 3, 4 and 5 within a range to which the single number belongs have been specifically disclosed in the description for the range from 1 to 5, and it is applicable regardless of the range.

In addition, a value range indicated herein refers to any referenced numbers (fractions or integers) within the referred range.

In a first aspect, the present application provides an adhesive, including epoxy resin, phenoxy resin, an indene oligomer, filler and a curing agent; and 20-60 parts of the epoxy resin, 20-30 parts of the phenoxy resin, 5-10 parts of the indene oligomer, 15-30 parts of the filler and 1-5 parts of the curing agent are provided in parts by mass;

wherein the indene oligomer has a chemical structural formula shown as:

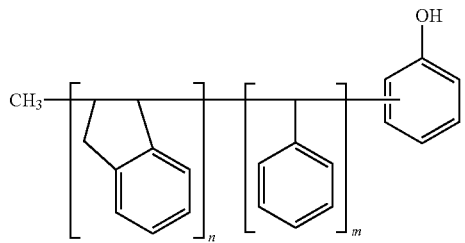

wherein n and m are integers, 1≤n≤10, and 1≤m≤6.

It needs to be noted that the indene oligomer in the present application is a polymer having an indenyl (—C9H8-) and having a molecular formula: CH3(C9H8)n(CH2)x(C6H5CH)mC6H5O, wherein x is an integer, and x≥0. The adhesive provided by the present application is internally added with the indene oligomer which is crosslinked with the epoxy resin in a curing process, so that a cured product can play a role in releasing a stress in a stress state to relieve the degree of stress concentration, a crosslinked network chain formed after the adhesive is cured can uniformly bear a greater stress, and the stress release property of the adhesive is improved. At the same time, due to the addition of the indene oligomer, the glass transition temperature of the adhesive can also be raised, and the thermal resistance, stability, moisture resistance and chemical resistance of the adhesive can be improved, so that the adhesive is wider in application range.

In some embodiments, 45-50 parts of the epoxy resin, 25-30 parts of the phenoxy resin, 8-10 parts of the indene oligomer, 20-25 parts of the filler and 2-3 parts of the curing agent are included, so that the adhesive is better in property.

In some embodiments, 50 parts of the epoxy resin, 25 parts of the phenoxy resin, 10 parts of the indene oligomer, 25 parts of the filler and 2 parts of the curing agent are included.

In some embodiments, a ratio of the indenyl in the indene oligomer is 60%-70%, so that the phenomenon that the adhesive becomes brittle after being cured due to the excessively high content of the indenyl in the indene oligomer to affect the tensile strength of the adhesive is avoided; at the same time, the phenomenon that the technical effects of stress release property, adhesive property and glass transition temperature of the adhesive cannot be improved due to the excessively low content of the indenyl in the indene oligomer is avoided.

In some embodiments, the epoxy resin includes bisphenol epoxy resin, polyurethane-modified epoxy resin and naphthalene ring epoxy resin:and a mass ratio of the bisphenol epoxy resin to the polyurethane-modified epoxy resin to the naphthalene ring epoxy resin is 1:(1-2):(0.25-0.67).

In some embodiments, the mass ratio of the bisphenol epoxy resin to the polyurethane-modified epoxy resin to the naphthalene ring epoxy resin is 3:5:2.

It should be noted that the epoxy resin in the present application is thermocured resin with epoxy groups.

In some embodiments, an epoxy equivalent of the bisphenol epoxy resin is 160-180 g/eq; and/or an epoxy equivalent of the polyurethane-modified epoxy resin is 210-250 g/eq. It should be noted that the epoxy equivalent refers to the gram (g/eq) of resin containing 1 equivalent of epoxy groups in the present application.

In the adhesive, the bisphenol epoxy resin is adopted as a curing substrate, so that the viscosity of the adhesive can be lowered, the film forming property can be improved, the film forming property of the adhesive in application to the die attach film is better, and then, the performance of a semiconductor is improved. In the adhesive, the polyurethane-modified epoxy resin is adopted to introduce polyurethane, so that the resin obtained after curing forms an interpenetrating polymer network structure to improve the adhesion and tensile strength of the cured adhesive. In the adhesive, the naphthalene ring epoxy resin is adopted to introduce naphthalene rings which are not easy to rotate, so that the resin obtained by curing is very strong in cohesion and good in molecular orientation, the moisture absorption property and thermal expansion coefficient of the resin formed after curing are lowered, the tensile strength and glass transition temperature of the resin are improved, and a film layer formed after the adhesive is cured has good thermal resistance, moisture resistance, chemical resistance and stability.

In some embodiments, the bisphenol epoxy resin is selected from one or more of bisphenol-F epoxy resin, bisphenol-S epoxy resin and bisphenol-A epoxy resin, so that the adhesive is low in crystallinity when being cured, and the resin obtained after curing has a good surface appearance.

In the present application, the epoxy resin any adopt any one of a liquid, a solid and a semisolid.

In some embodiments, the phenoxy resin in the present disclosure is thermoplastic resin of which the weight-average molecular weight is 30000-60000, so that the brittleness of the resin obtained after the adhesive is cured is lowered, the support and melt viscosity of the resin obtained by curing are improved, the adhesive is easy to peel or cut when being cured to form a film, at the same time, the thermal stress and warpage of the film layer formed after the adhesive is cured are reduced.

In some embodiments, the curing agent is selected from one or more of dicyandiamide, a naphthol curing agent and phenolic resin.

In some embodiments, the curing agent is selected from the naphthol curing agent, wherein a hydroxyl equivalent of the naphthol curing agent is 100-120 g/eq, so that the resin obtained after the adhesive is cured has good thermal resistance and moisture resistance. It should be noted that the hydroxyl equivalent refers to the gram (g/eq) of a naphthol curing agent containing 1 equivalent of hydroxyls in the present application.

The naphthol curing agent may be selected from 2-naphthol, 1-imidazolylmethyl-2-naphthol and other naphthol derivatives.

In some embodiments, the adhesive further includes an accelerator, and 0.1-0.5 part of the accelerator is provided in parts by mass. The accelerator in the present application is a curing accelerator and is used for increasing a rate of reaction between the curing agent and each of the epoxy resin and the phenoxy resin, increasing the curing efficiency, controlling the curing time of the adhesive and increasing the production efficiency.

In some embodiments, the accelerator may be selected from an imidazole curing accelerator and an amine curing accelerator. The imidazole curing accelerator may be selected from 2-methylimidazole, 2-phenylimidazole, 2-phenyl-4,5-dimethylimidazole, 2-phenyl-4-methylimidazole, 2-phenyl-4-methyl-5-hydroxymethylimidazole, etc. The amine curing accelerator may be selected from tertiary amines and salts thereof, fatty amines, etc. and preferably selected from the tertiary amines.

In some embodiments, the filler may be selected from particles of which the particle sizes are 1-100 μm, and it may be specifically selected from conventional filler particles such as silica, calcium carbonate, aluminum oxide and diatomite.

In some embodiments, the filler is preferably spherical silica which is good in film forming property and insulating property and is beneficial to improvement on the thermal expansion coefficient of the resin obtained after the adhesive is cured at the same time. It should be noted that spherical silica means that the particles of silica are spherical or similarly spherical in the present application.

In some embodiments, silica is treated by using a silane coupling agent so that the resin obtained after the adhesive is cured is lower in water absorption property and thermal stress.

The silane coupling agent may be selected from a silane monomer, vinyl silane, methacrylic silane, epoxy silane, thiosilane, sulfurized silane, amino silane, ureido silane, isocyanatosilane, etc. and is preferably a silane coupling agent without high-hydrophility groups, such as a vinyl silane coupling agent such as A171, A172 and A151.

In some embodiments, the silane coupling agent used for silica is treated by the following steps:

a solution of the silane coupling agent is provided, and the solution of the silane coupling agent is mixed with silica to obtain surface-treated silica.

A solvent in the solution of the silane coupling agent may be selected from toluene, xylene, methyl isobutyl ketone, methyl ethyl ketone, monopolyether, dipolyether, etc. There are no limitations on the concentration of the silane coupling agent in the solution of the silane coupling agent.

In a second aspect, the present application further discloses a chip attach film which is prepared from the adhesive prepared in the first aspect. In the present application, the chip attach film is prepared from the adhesive in the first aspect by using a film forming process, and the chip attach film has higher glass transition temperature and tensile strength and lower thermal expansion coefficient and storage modulus, so that the thermal stress is lower, the warpage of the DAF is reduced, the delamination and fracture of chips and the DAF due to the thermal stress and warpage of the die attach film in a manufacturing process of a semiconductor device are reduced, and then, the performance of the semiconductor device is improved.

In a third aspect, the present application further provides a preparation method for a chip attach film, including:

raw materials of the adhesive provided in the first aspect are provided; and after the raw materials are mixed, flattening and drying are performed to obtain the die attach film.

It should be noted that "flattening" described herein means that a mixture obtained after the raw materials are uniformly mixed forms a film layer with a flat surface, which may be specifically implemented by adopting the following steps:

the mixture obtained after the raw materials are uniformly mixed is coated on a base material to form the film layer with the flat surface.

In some embodiments, the preparation method for the die attach film includes the following steps:

a base material and raw materials of the adhesive provided in the first aspect are provided; and after the raw materials of the adhesive are mixed, the mixture is coated on the base material and is dried to form the DAF on the base material.

In some embodiments, the raw materials of the adhesive are mixed in the solvent. Preferably, the solid content of slurry formed after mixing is 70 wt %-85 wt %, wherein the solvent may be selected from toluene, xylene, methyl isobutyl ketone, ethyl acetate, butyl acetate, PMA, etc.

The base material may be selected from a release film and may be selected from a PET film, a PE film, etc. according to the type of the material.

In some embodiments, after being coated on the base material, the mixture is dried in a drying oven. The base material coated with the mixture is dried in the drying oven at 145° C. for two minutes, so that drying is implemented.

In order to enable the above-mentioned implementation details and operation of the present application to be clearly understood by those skilled in the art and remarkably embody the progressivity of the adhesive and the die attach film in the embodiments of the present application, the above-mentioned technical solutions will be illustrated as below with a plurality of embodiments.

The phenoxy resin adopted in the following specific embodiments is purchased from Xiamen Acoma Chemical Co., Ltd., its model is PKHM-301, and its weight-average molecular weight is 30000-60000:

the bisphenol-F epoxy resin adopted in the following specific embodiments is purchased from South Asia Epoxy Resin (Kunshan) Co., Ltd., its model is NPEF-170, and its epoxy equivalent EEW (g/eq) is 160-180;

the bisphenol-A epoxy resin adopted in the following specific embodiments is purchased from South Asia Epoxy Resin (Kunshan) Co., Ltd., its model is NPEL-128, and its epoxy equivalent EEW (g/eq) is 180-190;

the polyurethane-modified epoxy resin adopted in the following specific embodiments is purchased from Complex High-Tech Materials (Shanghai) Co., Ltd, its model is EPU-133, and its epoxy equivalent EEW (g/eq) is 210-250;

the naphthalene ring epoxy resin adopted in the following specific embodiments is purchased from DIC Co., Ltd., its model is HP-4770, and its epoxy equivalent EEW (g/eq) is 195-210;

the indene oligomer adopted in the following specific embodiments is purchased from Nippon Steel & Sumikin Chemical Co., Ltd, and its model is I-100;

silica adopted in the following specific embodiments is purchased from DENKA Co., Ltd., its model is 20M, and its particle size is 0.1-5 um;

the naphthol curing agent adopted in the following specific embodiments is purchased from KEYMATE Materials Technology Co., Ltd., and its model is SN-395; and 4,5-bis(hydroxymethyl)-2-phenyl-1H-imidazole adopted in the following specific embodiments is purchased from SK Chemical Research Co., Ltd., and its model is 2PHZ.

Embodiment 1

An adhesive includes 15 parts of bisphenol-F epoxy resin, 25 parts of polyurethane-modified epoxy resin, 10 parts of naphthalene ring epoxy resin, 20 parts of phenoxy resin, 5 parts of indene oligomer, 17.5 parts of silica, 4 parts of DICY (dicyandiamide) and 0.1 part of 4,5-bis(hydroxymethyl)-2-phenyl-1H-imidazole in parts by mass.

A die attach film is prepared from the raw materials of the adhesive provided in the present embodiment, specific preparation steps thereof are described as follows:

a PET release film is provided; and the raw materials of the above-mentioned adhesive are uniformly mixed with methyl isobutyl ketone serving as a solvent to obtain a mixture, the mixture is coated on the PET release film by using a coating machine, and drying is performed in a drying oven to obtain a die attach film A on the PET release film.

Embodiment 2

An adhesive includes 15 parts of bisphenol-F epoxy resin, 30 parts of polyurethane-modified epoxy resin, 15 parts of naphthalene ring epoxy resin, 30 parts of phenoxy resin, 10 parts of indene oligomer, 20 parts of silica, 3 parts of DICY (dicyandiamide) and 0.2 part of 4,5-bis(hydroxymethyl)-2-phenyl-1H-imidazole in parts by mass.

A die attach film is prepared from the raw materials of the adhesive provided in the present embodiment, a specific preparation method thereof is the same as the preparation method for the die attach film A in embodiment 1, and thus, a die attach film B is obtained.

Embodiment 3

An adhesive includes 15 parts of bisphenol-F epoxy resin, 25 parts of polyurethane-modified epoxy resin, 10 parts of naphthalene ring epoxy resin, 30 parts of phenoxy resin, 10 parts of indene oligomer, 25 parts of silica, 1 part of naphthol curing agent and 0.2 part of 2-phenyl-4-methylimidazole (2P4MZ) in parts by mass.

A die attach film is prepared from the raw materials of the adhesive provided in the present embodiment, a specific preparation method thereof is the same as the preparation method for the die attach film A in embodiment 1, and thus, a die attach film C is obtained.

Embodiment 4

An adhesive includes 15 parts of bisphenol-F epoxy resin, 25 parts of polyurethane-modified epoxy resin, 5 parts of naphthalene ring epoxy resin, 30 parts of phenoxy resin, 10 parts of indene oligomer, 25 parts of silica, 2 parts of naphthol curing agent and 0.1 part of 2-phenyl-4-methylimidazole (2P4MZ) in parts by mass.

A die attach film is prepared from the raw materials of the adhesive provided in the present embodiment, a specific preparation method thereof is the same as the preparation method for the die attach film A in embodiment 1, and thus, a die attach film D is obtained.

Embodiment 5

An adhesive includes 15 parts of bisphenol-F epoxy resin, 25 parts of polyurethane-modified epoxy resin, 10 parts of naphthalene ring epoxy resin, 25 parts of phenoxy resin, 10 parts of indene oligomer, 25 parts of silica, 2 parts of naphthol curing agent and 0.5 part of 2-phenyl-4-methylimidazole (2P4MZ) in parts by mass.

A die attach film is prepared from the raw materials of the adhesive provided in the present embodiment, a specific preparation method thereof is the same as the preparation method for the die attach film A in embodiment 1, and thus, a die attach film E is obtained.

Embodiment 6

An adhesive includes 15 parts of bisphenol-A epoxy resin, 25 parts of polyurethane-modified epoxy resin, 10 parts of naphthalene ring epoxy resin, 25 parts of phenoxy resin, 10 parts of indene oligomer, 25 parts of silica, 2 parts of naphthol curing agent and 0.2 part of 4,5-bis(hydroxymethyl)-2-phenyl-1H-imidazole in parts by mass.

A die attach film is prepared from the raw materials of the adhesive provided in the present embodiment, a specific preparation method thereof is the same as the preparation method for the die attach film A in embodiment 1, and thus, a die attach film F is obtained.

Embodiment 7

An adhesive includes 15 parts of bisphenol-A epoxy resin, 25 parts of polyurethane-modified epoxy resin, 10 parts of naphthalene ring epoxy resin, 25 parts of phenoxy resin, 10 parts of indene oligomer, 25 parts of silica, 2 parts of dicyandiamide and 0.2 part of 4,5-bis(hydroxymethyl)-2-phenyl-1H-imidazole in parts by mass.

A die attach film is prepared from the raw materials of the adhesive provided in the present embodiment, a specific preparation method thereof is the same as the preparation method for the die attach film A in embodiment 1, and thus, a die attach film H is obtained.

Comparative Example 1

Compared with embodiment 1, the present comparative example provides an adhesive which does not include an indene oligomer, and other raw materials of the adhesive are the same as those in embodiment 1.

A die attach film is prepared from the raw materials of the adhesive provided in the present comparative example, a specific preparation method thereof is the same as the preparation method for the die attach film A in embodiment 1, and thus, a die attach film DB1 is obtained.

Comparative Example 2

Compared with embodiment 1, the present comparative example provides an adhesive which does not include naphthalene ring epoxy resin, and other raw materials of the adhesive are the same as those in embodiment 1.

A die attach film is prepared from the raw materials of the adhesive provided in the present comparative example, a specific preparation method thereof is the same as the preparation method for the die attach film A in embodiment 1, and thus, a die attach film DB2 is obtained.

Comparative Example 3

Compared with embodiment 1, the present comparative example provides an adhesive which does not include naphthalene ring epoxy resin and an indene oligomer, and other raw materials of the adhesive are the same as those in embodiment 1.

A die attach film is prepared from the raw materials of the adhesive provided in the present comparative example, a specific preparation method thereof is the same as the preparation method for the die attach film A in embodiment 1, and thus, a die attach film DB3 is obtained.

Comparative Example 4

Compared with embodiment 1, the present comparative example provides an adhesive which does not include bisphenol-F epoxy resin, and other raw materials of the adhesive are the same as those in embodiment 1.

A die attach film is prepared from the raw materials of the adhesive provided in the present comparative example, a specific preparation method thereof is the same as the preparation method for the die attach film A in embodiment 1, and thus, a die attach film DB4 is obtained.

Comparative Example 5

Compared with embodiment 1, the present comparative example provides an adhesive which does not include polyurethane-modified epoxy resin, and other raw materials of the adhesive are the same as those in embodiment 1.

A die attach film is prepared from the raw materials of the adhesive provided in the present comparative example, a specific preparation method thereof is the same as the preparation method for the die attach film A in embodiment 1, and thus, a die attach film DB5 is obtained.

Comparative Example 6

Compared with embodiment 3, the present comparative example provides an adhesive adopting an indene oligomer meeting the conditions that n=10 and m=9 to replace the indene oligomer in embodiment 3, and other raw materials of the adhesive are the same as those in embodiment 3.

A die attach film is prepared from the raw materials of the adhesive provided in the present comparative example, a specific preparation method thereof is the same as the preparation method for the die attach film A in embodiment 1, and thus, a die attach film DB6 is obtained.

Comparative Example 7

Compared with embodiment 3, the present comparative example provides an adhesive adopting an indene oligomer meeting the conditions that n=1 and m=8 to replace the indene oligomer in embodiment 3, and other raw materials of the adhesive are the same as those in embodiment 3.

A die attach film is prepared from the raw materials of the adhesive provided in the present comparative example, a specific preparation method thereof is the same as the preparation method for the die attach film A in embodiment 1, and thus, a die attach film DB7 is obtained.

Comparative Example 8

Compared with embodiment 3, the present comparative example adopts phenoxy resin of which the weight-average molecular weight is 10000-20000 to replace the phenoxy resin in embodiment 3, and other raw materials of the adhesive are the same as those in embodiment 3.

A die attach film is prepared from the raw materials of the adhesive provided in the present comparative example, a specific preparation method thereof is the same as the preparation method for the die attach film A in embodiment 1, and thus, a die attach film DB8 is obtained.

Comparative Example 9

An adhesive includes 15 parts of bisphenol-F epoxy resin, 25 parts of polyurethane-modified epoxy resin, 5 parts of naphthalene ring epoxy resin, 20 parts of phenoxy resin, 15 parts of silica, 2 parts of dicyandiamide and 0.1 part of 4,5-bis(hydroxymethyl)-2-phenyl-1H-imidazole in parts by mass.

A die attach film is prepared from the raw materials of the adhesive provided in the present comparative example, a specific preparation method thereof is the same as the preparation method for the die attach film A in embodiment 1, and thus, a die attach film DB9 is obtained.

Comparative Example 10

An adhesive includes 15 parts of bisphenol-F epoxy resin, 20 parts of polyurethane-modified epoxy resin, 25 parts of phenoxy resin, 30 parts of silica, 3 parts of dicyandiamide and 0.1 part of 4,5-bis(hydroxymethyl)-2-phenyl-1H-imidazole in parts by mass.

A die attach film is prepared from the raw materials of the adhesive provided in the present comparative example, a specific preparation method thereof is the same as the preparation method for the die attach film A in embodiment 1, and thus, a die attach film DB10 is obtained.

Comparative Example 11

An adhesive includes 20 parts of bisphenol-F epoxy resin, 20 parts of polyurethane-modified epoxy resin, 30 parts of phenoxy resin, 25 parts of silica, 2 parts of dicyandiamide and 0.2 part of 4,5-bis(hydroxymethyl)-2-phenyl-1H-imidazole in parts by mass.

A die attach film is prepared from the raw materials of the adhesive provided in the present comparative example, a specific preparation method thereof is the same as the preparation method for the die attach film A in embodiment 1, and thus, a die attach film DB11 is obtained.

Comparative Example 12

An adhesive includes 20 parts of bisphenol-F epoxy resin, 20 parts of polyurethane-modified epoxy resin, 30 parts of phenoxy resin, 25 parts of silica and 2 parts of dicyandiamide in parts by mass.

A die attach film is prepared from the raw materials of the adhesive provided in the present comparative example, a specific preparation method thereof is the same as the preparation method for the die attach film A in embodiment 1, and thus, a die attach film DB12 is obtained.

Each of the die attach films obtained in above-mentioned embodiments 1 to 7 and comparative examples 1 to 12 is cured at 165° C. for 1 h and is cut to form a sample having a length of 55 mm, a width of 10 mm and a height of 2 mm.

A storage modulus, a thermal expansion coefficient, a glass transition temperature, a tensile strength of the film, a moisture absorption rate and flame retardance are respectively tested, and test results thereof are shown as table 1.

The storage modulus: the cured sample is tested according to ASTM E2254-2018, wherein a test mode is a dual cantilever mode, a vibration frequency is 1 Hz, a an amplitude is 10 μm, and a temperature rise rate is 3° C./min;

the thermal expansion coefficient and the glass transition temperature: the cured sample is tested according to ASTM E831-2019, and test parameters thereof include: a preloading force: 0.05N, first scanning: the room temperature is raised to 250° C. (the temperature rise rate is 10° C./min), and second scanning: the room temperature is raised to 250° C. (the temperature rise rate is 10° C./min), and curve data on a second temperature rise segment is acquired;

the tensile strength of the film: a universal material testing machine is used for test, and test steps thereof include: the cured sample is cut into a die attach film having a length of 10 mm and a width of 50 mm to serve as a sample, a light release film in a release film is torn off, two ends of the sample are stuck by using an adhesive tape, the adhesive tape on the two ends is clamped by a clamp of the universal material testing machine, a heavy release film in the release film is torn off, and the tensile strength of the film is tested;

the moisture absorption rate: each of the die attach films obtained in embodiments 1 to 8 and comparative examples 1 to 12 is cut into a die attach film having a length of 50 mm and a width of 50 mm to serve as a sample, and the sample is transferred and stuck to a silicon wafer and is weighed as m1 after being cured at 165° C. for 1 h; then, the silicon wafer is perpendicularly and completely immersed into a glass vessel holding 25±1° C. distilled water, no air bubbles are attached to the surface of the silicon wafer, and the silicon water is not in contact with a wall of the vessel; after being immersed into water for 24 h, the silicon wafer is taken out by using forceps, water on the surface of the film is rapidly sucked by using filter paper, and it is immediately weighed as m2; and the moisture absorption rate is calculated according to a calculation formula that the moisture absorption rate=(m2−m1)/m1×100%;

the flame retardance: each of the die attach films obtained in embodiments 1 to 8 and comparative examples 1 to 8 is cured at 165° C. for 1 h and cut into a sample having a length of 130 mm, a width of 100 mm and a height of 3 mm, a bunsen burner is placed in the center below the sample, an orifice of the bunsen burner is 10 mm away from a bottom end of the sample, the ignition time lasts for 10 s, the bunsen burner is moved for 150 mm at a speed of 300 mm/sec after 10 s since ignition, at the same time, the residual flame time starts to be recorded as t1, ignition is immediately performed for 10 s when residual flame stops, the bunsen burner is moved for 150 mm at a speed of 300 mm/sec after 10 s since ignition, at the same time, the residual flame time is recorded as t2, and the flame retardance is obtained according to t1 and t2, and the silicon wafer adhesion: two pieces of film with each having a length of 5 mm, a width of 5 mm and a thickness of 25 um are transferred and stuck to the silicon wafer and are cured at 150° C. for 1 h, and then, the shear bonding strength is tested by using a universal tensile tester.

TABLE 1

|  | Storage Modulus (GPa) | Glass Transition Temperature (° C.) | Tensile Strength of Film (MPa) | Thermal Expansion Coefficient (ppm/° C.) | Moisture Absorption Rate (%) | Silicon Wafer Adhesion (MPa) | Flame Retardance |
| --- | --- | --- | --- | --- | --- | --- | --- |
| Embodiment 1 | 3.3 | 110 | 9 | 55/163 | 0.18 | 15 | V-2 |
| Embodiment 2 | 3.3 | 115 | 8 | 52/155 | 0.19 | 17 | V-2 |

TABLE 1-continued

|  | Storage Modulus (GPa) | Glass Transition Temperature (° C.) | Tensile Strength of Film (MPa) | Thermal Expansion Coefficient (ppm/° C.) | Moisture Absorption Rate (%) | Silicon Wafer Adhesion (MPa) | Flame Retardance |
|---|---|---|---|---|---|---|---|
| Embodiment 3 | 3.0 | 118 | 12 | 50/153 | 0.18 | 16 | V-1 |
| Embodiment 4 | 2.8 | 120 | 13 | 45/150 | 0.17 | 17 | V-1 |
| Embodiment 5 | 2.3 | 130 | 18 | 40/145 | 0.15 | 18 | V-0 |
| Embodiment 6 | 3.3 | 120 | 17 | 45/145 | 0.17 | 17 | V-0 |
| Embodiment 7 | 3.4 | 115 | 15 | 48/147 | 0.16 | 16 | V-1 |
| Comparative Example 1 | 4.2 | 100 | 5 | 55/158 | 0.24 | 10 | HB |
| Comparative Example 2 | 3.5 | 105 | 6 | 60/160 | 0.26 | 15 | HB |
| Comparative Example 3 | 4.5 | 98 | 4 | 65/164 | 0.32 | 10 | HB |
| Comparative Example 4 | 3.5 | 105 | 11 | 52/155 | 0.2 | 13 | V-1 |
| Comparative Example 5 | 3.5 | 108 | 8 | 58/160 | 0.2 | 12 | V-1 |
| Comparative Example 6 | 3.6 | 110 | 11 | 53/155 | 0.18 | 17 | V-2 |
| Comparative Example 7 | 3.4 | 108 | 7 | 55/153 | 0.15 | 15 | V-2 |
| Comparative Example 8 | 3.5 | 112 | 6 | 55/162 | 0.2 | 16 | V-2 |
| Comparative Example 9 | 3.5 | 105 | 8 | 58/162 | 0.2 | 12 | V-2 |
| Comparative Example 10 | 4.0 | 95 | 7 | 60/165 | 0.3 | 10 | HB |
| Comparative Example 11 | 3.8 | 95 | 5 | 65/170 | 0.26 | 10 | HB |
| Comparative Example 12 | 3.6 | 100 | 4 | 67/169 | 0.24 | 12 | HB |

It can be seen from table 1 that the die attach film prepared from the adhesive prepared by the present application adopts the indene oligomer as one of curable substrates, and is higher in glass transition temperature and tensile strength, lower in thermal expansion coefficient, storage modulus and moisture absorption property, stronger in silicon wafer adhesion and better in flame retardance as comparison with a die attach film prepared on the basis of an adhesive which does not include the indene oligomer. Thus, it can be seen that the die attach film prepared from the adhesive prepared by the present application is lower in thermal stress and better in thermal resistance, stability, moisture resistance and chemical resistance in a stress state and is not easy to warp in a cold and hot shock experiment, then, the situation that chips and the DAF are delaminated and fractured can be reduced, and the performance of the semiconductor device based on the die attach film is improved. Thus, it can be seen that the adhesive provided by the present application adopts the epoxy resin, the phenoxy resin and the indene oligomer as curable substrates, so that the indene oligomer can be crosslinked with the epoxy resin and the phenoxy resin under the action of a curing agent, then, the DAF obtained by curing can play a role in releasing a stress in a stress state to relieve the degree of stress concentration, a crosslinked network chain formed by curing can uniformly bear a greater stress, the stress release property of the DAF is improved, the thermal stress generated by the DAF in the cold and hot shock experiment is reduced, and the situation that the DAF and chips adhered thereto warp is reduced.

In addition, it can be known from performances of the die attach films obtained in embodiment 3 and comparative examples 6 to 8 that the content of an indenyl in the indene oligomer should not be too high or too low, the too high or too low content of the indenyl will affect performances of the adhesive and the die attach film based on the adhesive; and the weight-average molecular weight of the phenoxy resin should not be too low either.

In addition, the epoxy resin in the adhesive provided by the present application adopts bisphenol epoxy resin, polyurethane-modified epoxy resin and naphthalene ring epoxy resin which are crosslinked and cured to achieve high adhesion and tensile strength.

The adhesive, the die attach film and the preparation method therefor provided in the embodiments of the present application have been introduced in detail as above. Specific individual examples are applied herein to describe the principle and implementations of the present application. The descriptions of the above-mentioned embodiments are only intended to help understand the method and core concept of the present application. At the same time, those skilled in the art may, based on the concept of the present application, make modifications with respect to the specific implementations and the application scope. In conclusion, the content of this specification shall not be understood as a limitation on the present application.

What is claimed is:

1. An adhesive, comprising epoxy resin, phenoxy resin, an indene oligomer, filler and a curing agent; and 20-60 parts of the epoxy resin, 20-30 parts of the phenoxy resin, 5-10 parts of the indene oligomer, 15-30 parts of the filler and 1-5 parts of the curing agent are provided in parts by mass;

wherein the indene oligomer has a chemical structural formula shown as:

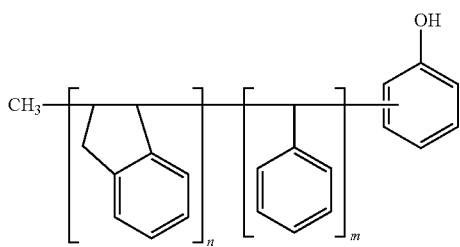

wherein n and m are integers, $1 \leq n \leq 10$, and $1 \leq m \leq 6$; and
a weight-average molecular weight of the phenoxy resin is within a range of 30000-60000.

2. The adhesive of claim 1, wherein the epoxy resin comprises bisphenol epoxy resin, polyurethane-modified epoxy resin and naphthalene ring epoxy resin; and
a mass ratio of the bisphenol epoxy resin to the polyurethane-modified epoxy resin to the naphthalene ring epoxy resin is 1:(1-2):(0.25-0.67).

3. The adhesive of claim 2, wherein an epoxy equivalent of the bisphenol epoxy resin is 160-180 g/eq; and/or an epoxy equivalent of the polyurethane-modified epoxy resin is 210-250 g/eq.

4. The adhesive of claim 2, wherein the bisphenol epoxy resin is selected from one or more of bisphenol-F epoxy resin, bisphenol-S epoxy resin and bisphenol-A epoxy resin.

5. The adhesive of claim 1, wherein the adhesive further comprises an accelerator, and 0.1-0.5 part of the accelerator is provided in parts by mass.

6. The adhesive of claim 5, wherein the accelerator is selected from an imidazole curing accelerator and an amine curing accelerator.

7. The adhesive of claim 1, wherein 45-50 parts of the epoxy resin, 25-30 parts of the phenoxy resin, 8-10 parts of the indene oligomer, 20-25 parts of the filler and 2-3 parts of the curing agent are provided in parts by mass.

8. The adhesive of claim 1, wherein the curing agent is selected from one or more of dicyandiamide, a naphthol curing agent and phenolic resin.

9. A die attach film, being prepared from the adhesive of claim 1.

10. A preparation method for the die attach film of claim 9, comprising:
providing raw materials of the adhesive of claim 1; and
after the raw materials are mixed, performing flattening and drying to obtain the die attach film.

* * * * *